United States Patent
Wokhlu et al.

(10) Patent No.: US 10,042,773 B2
(45) Date of Patent: Aug. 7, 2018

(54) ADVANCE CACHE ALLOCATOR

(71) Applicant: Futurewei Technologies, Inc., Plano, TX (US)

(72) Inventors: Sushma Wokhlu, Plano, TX (US); Lee McFearin, Plano, TX (US); Alan Gatherer, Richardson, TX (US); Ashish Shrivastava, Plano, TX (US); Peter Yifey Yan, Frisco, TX (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 129 days.

(21) Appl. No.: 14/811,436

(22) Filed: Jul. 28, 2015

(65) Prior Publication Data

US 2017/0031829 A1   Feb. 2, 2017

(51) Int. Cl.
*G06F 12/08* (2016.01)
*G06F 12/0879* (2016.01)
*G06F 12/0895* (2016.01)

(52) U.S. Cl.
CPC ...... *G06F 12/0879* (2013.01); *G06F 12/0895* (2013.01); *G06F 2212/60* (2013.01)

(58) Field of Classification Search
CPC ............... G06F 12/0864; G06F 12/082; G06F 12/0862; G06F 12/0875; G06F 12/0802; G06F 12/02; G06F 12/0842; G06F 12/0848; G06F 12/0893; G06F 2212/6042; G06F 12/0871; G06F 12/0895; G06F 12/0897;
(Continued)

(56) References Cited

U.S. PATENT DOCUMENTS

| 5,848,428 A | 12/1998 | Collins |
| 6,138,213 A | 10/2000 | McMinn |

(Continued)

FOREIGN PATENT DOCUMENTS

| CN | 1757018 A | 4/2006 |
| CN | 103810009 A | 5/2014 |

(Continued)

OTHER PUBLICATIONS

International Search Report and Written Opinion from International Application No. PCT/CN2016/089188, dated Oct. 11, 2016.

*Primary Examiner* — Reginald G Bragdon
*Assistant Examiner* — Thanh D Vo
(74) *Attorney, Agent, or Firm* — Futurewei Technologies, Inc.

(57) ABSTRACT

Systems and techniques for advance cache allocation are described. A described technique includes selecting a job from a plurality of jobs; selecting a processor core from a plurality of processor cores to execute the selected job; receiving a message which describes future memory accesses that will be generated by the selected job; generating a memory burst request based on the message; performing the memory burst request to load data from a memory to at least a dedicated portion of a cache, the cache corresponding to the selected processor core; and starting the selected job on the selected processor core. The technique can include performing an action indicated by a send message to write one or more values from another dedicated portion of the cache to the memory.

17 Claims, 6 Drawing Sheets

(58) Field of Classification Search
CPC ..... G06F 2212/6028; G06F 2212/6046; G06F 2212/6082
See application file for complete search history.

(56) References Cited

U.S. PATENT DOCUMENTS

| | | | |
|---|---|---|---|
| 6,868,485 B1* | 3/2005 | Conway | G06F 12/082 |
| | | | 709/218 |
| 7,698,541 B1* | 4/2010 | Robles | G06F 9/4812 |
| | | | 712/244 |
| 8,069,310 B1 | 11/2011 | Levin-Michael et al. | |
| 2003/0065889 A1* | 4/2003 | Kamitani | G06F 12/0862 |
| | | | 711/137 |
| 2006/0190688 A1 | 8/2006 | Van Eijndhoven et al. | |
| 2008/0183688 A1* | 7/2008 | Chamdani | G06F 17/30442 |
| 2014/0215157 A1* | 7/2014 | Moir | G06F 12/0811 |
| | | | 711/122 |
| 2015/0324234 A1* | 11/2015 | Chang | G06F 9/5033 |
| | | | 718/104 |

FOREIGN PATENT DOCUMENTS

| | | | | |
|---|---|---|---|---|
| EP | 1131702 B1 * | 4/2009 | ........... | G06F 9/3842 |
| WO | 2003034229 A1 | 4/2003 | | |
| WO | 2005116840 A2 | 12/2005 | | |

* cited by examiner

ADVANCE CACHE ALLOCATOR

BACKGROUND

This patent document relates generally to memory caching techniques and systems. Computer systems can include one or more processors to execute programs and memory such as random access memory (RAM) to store data associated with the programs. A program can include load instructions to read data from memory and store instructions to write data to memory. If a cache does not have the requested data, a cache miss occurs and the system has to access data from another memory such as a different layer of cache or, worse, from main memory. Some computer systems can employ techniques such as cache prefetching or cache pre-warming.

SUMMARY

This document describes, among other things, technologies relating to advance cache allocation. In one aspect, a described technique includes selecting a job from a plurality of jobs; selecting a processor core from a plurality of processor cores to execute the selected job; receiving a message which describes future memory accesses that will be generated by the selected job; generating a memory burst request based on the message; performing the memory burst request to load data from a memory to at least a dedicated portion of a cache, the cache corresponding to the selected processor core; and starting the selected job on the selected processor core. The technique can include performing an action indicated by a send message to write one or more values from another dedicated portion of the cache to the memory.

In another aspect, a system for advance cache allocation can include a bus to provide access to a memory; processor cores; caches coupled respectively with the processor cores and the bus; and a controller. The controller can be configured to select a job from a plurality of jobs to produce a selected job, select a processor core of the processor cores as a selected processor core to execute the job, receive a message which describes future memory accesses that will be generated by the selected job, generate a memory burst request based on the message, perform the memory burst request to load data from the memory to at least a dedicated portion of a cache of the caches, the cache corresponding to the selected processor core, and start the selected job on the selected processor core.

In yet another aspect, an apparatus for advance cache allocation can include first circuitry, such as a controller, processor, or specialized logic, configured to select a job from a plurality of jobs to produce a selected job, select a processor core of a plurality of processor cores as a selected processor core to execute the selected job, and start the selected job on the selected processor core; and second circuitry, such as a controller, processor, or specialized logic, configured to receive a message which describes future memory accesses that will be generated by the selected job, generate a memory burst request based on the message, and perform the memory burst request to load data from the memory to at least a dedicated portion of a cache corresponding to the selected processor core.

The details of one or more embodiments of the subject matter described in this document are set forth in the accompanying drawings and the description below. Other features, aspects, and advantages of the subject matter will become apparent from the description, the drawings, and the claims.

DETAILED DESCRIPTION

Computer systems, such as desktop computers, servers, smartphones, tablets, laptops and other devices require data which may have a storage retrieval cost. This storage retrieval cost may be characterized in terms of time, where the longer the time to obtain data equates to a higher cost. Data can be stored in a cache, such as a high speed memory, generally has the lowest cost to access. However, there is generally limited space in a cache in which data may be stored as cache memory. Data which is required by a device and stored in a cache is considered to be a cache hit (e.g., the data requested was in the cache) while data which is required by the device and not in the cache may be considered a cache miss (e.g., the data requested was not found in the cache). In order to minimize storage retrieval costs it is preferable to increase cache hit rates. Systems and methods are disclosed which cache hit rates may be increased.

In some implementations, before a processor switches between jobs, an advance cache allocator (ACA) can determine a specific memory region that will be used by the next job. The ACA can cause data elements within that memory region to be loaded into the processor's cache. For example, a job may process data elements from a memory region such as a buffer. The ACA can cause data elements from that buffer to be loaded into the processor's cache such that the job will experience cache hits with respect to the buffer. A portion of the cache can be dedicated to these advance cache allocations.

Particular embodiments of the technology described in this document can be implemented so as to realize one or more of the following advantages. Computer systems can integrate one or more advance cache allocators into their designs without modifying hardware components such as processor, cache, and/or cache controller logic. Advance cache allocations can increase cache hit rates.

Figure 1:
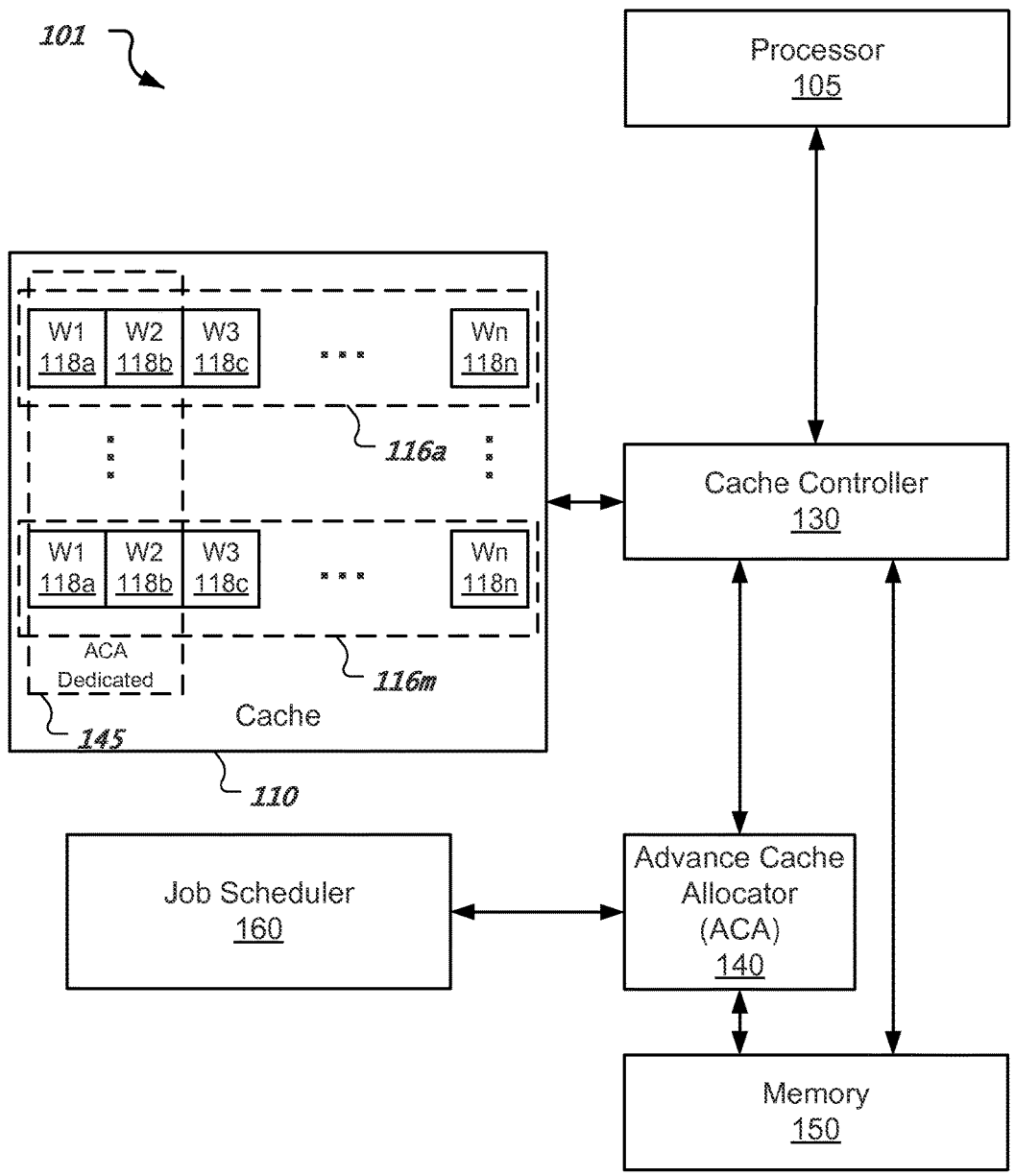
FIG. 1 shows an architecture of an example of a system that includes an advance cache allocator.

FIG. 1 shows an architecture of an example of a system 101 that includes an advance cache allocator 140. The system 101 can include one or more processors 105, cache 110, cache controller 130, advance cache allocator 140, memory 150, and job scheduler 160. The cache 110 can include a data cache, an instruction cache, or both. Advance cache allocation can be applied to the data cache, instruction cache, or both. In some implementations, memory 150 is a higher level cache. In some implementations, memory 150 is a main memory. In some implementations, the system 101 is a multi-core system with each processor core having its own cache and cache controller. Cache 110 may be an L1, L2, or L3 cache located on a processor die. In other cases, the cache 110 may be implemented on another semiconductor chip on a separate device which is in communication with the system 101.

The cache 110 can be an N-way set associative cache. The cache 110 includes multiple slots 116a-m. Each of the slots 116a-m is a different portion of the cache 110 that is reserved for different groups of memory addresses associated with memory 150. Each of the slots 116a-m includes N ways 118a-n (labelled W1, W2, . . . , Wn). For example, N can be 8. However other values for N are possible. If the cache 110 cannot satisfy a memory request from the processor 105, the cache controller 130 can load one or more data elements corresponding to the memory request from memory 150 in to the cache 110. The cache controller 130 may have to overwrite data within a slot 116a-m to store new data. To handle new data, a way 118a-n within a slot 116a-m can be selected based on a cache replacement policy such as least recently used (LRU) or first in first out (FIFO).

When the processor 105 switches between jobs, it may be unlikely that any of the data within the cache 110 will be used by the new job. Thus, a new job may initially experience a high degree of cache misses. To address such misses, the advance cache allocator 140 can load data elements that will be used by the new job from the memory 150 to an ACA portion 145 of the cache 110 while the processor 105 executes the job. By loading while the processor 105 executes the job, the advance cache allocator 140 can load data into the ACA portion 145 of the cache 110 before the job needs to use the data. For example, a first job can output values in an array for use by a second job. Based on knowing that the second job will need the values in the array, the advance cache allocator 140 can load those values into the cache 110 before the second job needs the values. When the data are successfully loaded before they are needed, the result is a cache hit and the associated increased speed in accessing the data. If not, the result is a cache miss, and the job executes as it originally would have without the ACA after the miss. This technique provides a distinction from pre-warming and other techniques. Processor 105 or a job scheduler 160 can generate information such as a receive message that details a specific memory region that will be accessed by the new job. In some implementations, such details can include a memory pointer and a size value to specify a range of data elements that start at the location pointed to by the memory pointer. Based on the receive message, the advance cache allocator 140 can load data elements from the specific memory region of memory 150 to the ACA portion 145 of the cache 110. For example, a job may process data elements from a memory region such as a known buffer. The advance cache allocator 140 can cause data elements from that buffer to be loaded into the cache 110 as the new job runs on the processor 105. Further, a job may output data elements to a buffer for processing by another job, which may be executed on a different processor having a different cache.

In some implementations, processor 105 or job scheduler 160 can generate information such as a send message that details a specific memory region that is required to be transferred from cache 110 to memory 150. A job scheduler 160 may issue a send message such that data elements in a buffer written to by a job are committed to memory 150. Based on a send message, the advance cache allocator 140 can write data elements stored in the cache 110 to a specific memory region of memory 150. In some implementations, the advance cache allocator 140 can handle a send message in the background, while the advance cache allocator 140 loads the cache 110 with data elements specified by a receive message.

In some implementations, one or more of the ways 118a-n of each of the slots 116a-m can be dedicated to the advance cache allocator 140. In some implementations, an ACA portion 145 can include a dedicated portion for data associated with receive messages and a dedicated portion for data associated with send messages. For example, cache slots can include one or more dedicated ways for a data element(s) associated with a receive message and one or more dedicated ways for a data element(s) associated with a send message. In some implementations, the advance cache allocator 140 can configure the size of the ACA portion 145. In some implementations, a system-on-a-chip (SoC) can includes some or all of the components in FIG. 1. In some implementations, a single integrated circuit (IC) can include the processor 105, cache 110, cache controller 130, advance cache allocator 140, and job scheduler 160. In some implementations, such an IC can additionally include memory 150.

Figure 2:
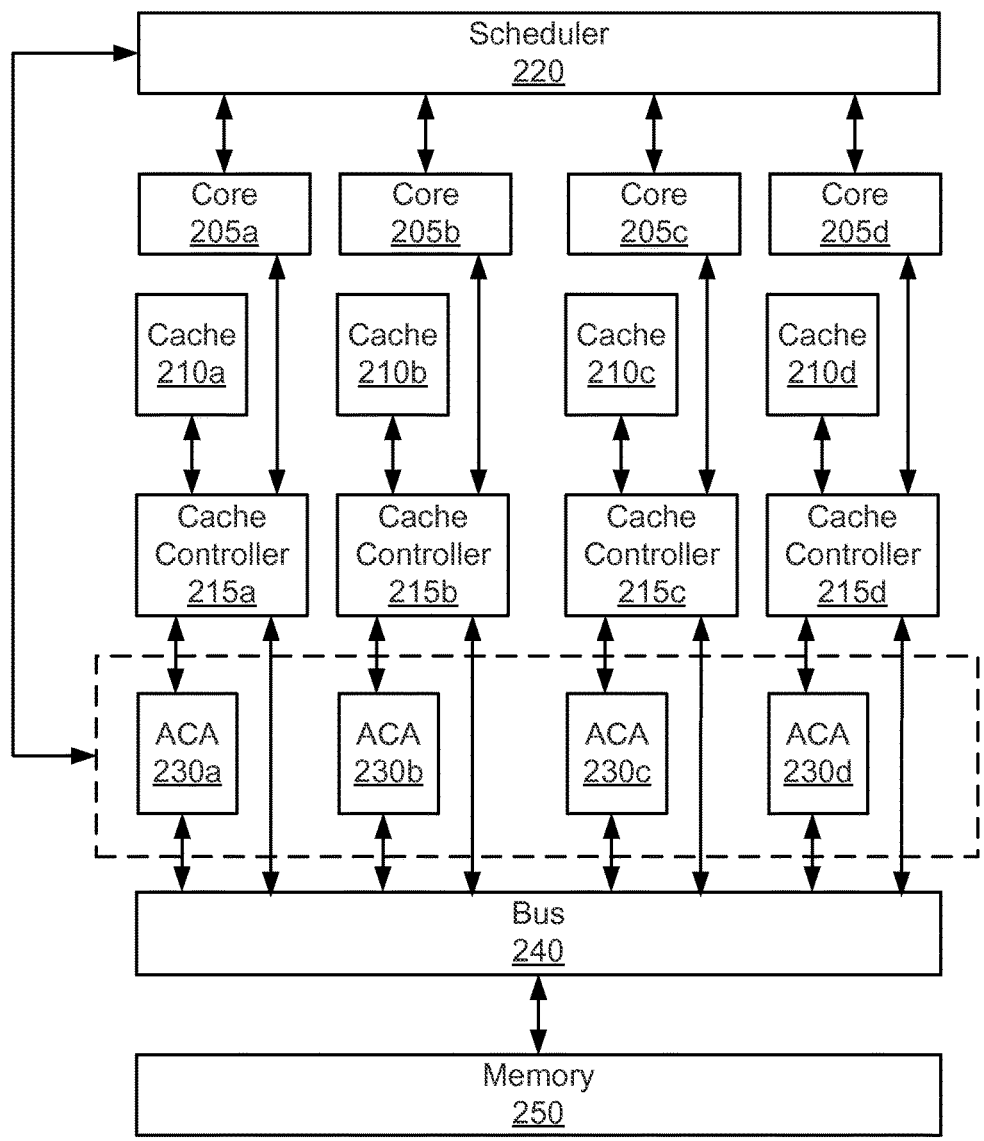
FIG. 2 shows an architecture of another example of a computer system that an advance cache allocator.

FIG. 2 shows an architecture of another example of a computer system 201 that includes advance cache allocators 230a-d. The computer system 201 can include processor cores 205a-d, with corresponding caches 210a-d, cache controllers 215a-d, and advance cache allocators 230a-d. The computer system 201 can include a scheduler 220, bus 240, and memory 250. The computer system 201 can be a message based system. The scheduler 220 can schedule jobs on the processor cores 205a-d. Executing a job on a processor core 205a-d can include executing instructions from software such as an operating system routine or an application. In some implementations, the job can be associated with a process identifier. In some implementations, the scheduler 220 causes a processor core 205a-d to switch among different jobs. Before a job switch, or while the new job is running, on a target processor core 205a, the scheduler 220 can send a message to an advance cache allocator 230a that corresponds to the target processor core 205a to inform the advance cache allocator 230a to start loading data elements into the cache 210a for use by the next job.

Processor requests via the cache controllers 215a-d can bypass the advance cache allocators 230a-d. Further, the advance cache allocators 230a-d can generate memory requests such as a burst memory request based on a target memory range for the next job. A burst memory request can be used to fill multiple cache lines. In some implementations, the bus 240 can arbitrate between requests coming from the processor cores 205a-d via the cache controllers 215a-d and requests generated by an advance cache allocation trigger. In some implementations, core memory requests have a higher priority than advance cache allocation based requests.

In some implementations, the scheduler 220 includes a processor core. In some implementations, the scheduler 220 includes a memory allocator. In some implementations, the cache controllers 215a-d can include the respective advance cache allocators 230a-d. In some implementations, the computer system 201 can be designed where the advance cache allocators 230a-d are merged into a single allocator. In some implementations, at least a portion of the system 201 can be implemented on a single integrated circuit with each advance cache allocator 230a-d having its own portion of the integrated circuit.

Figure 3:
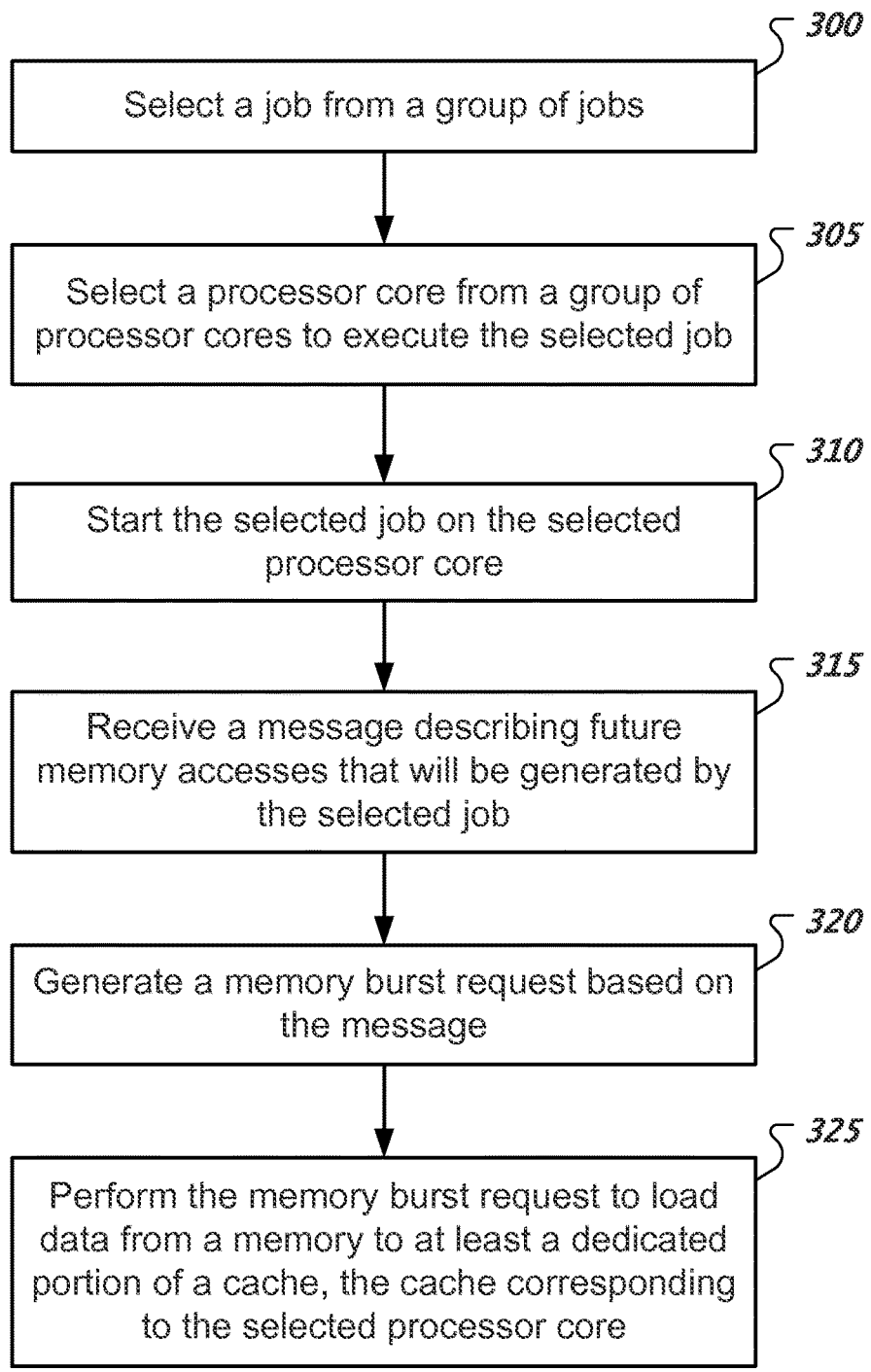
FIG. 3 shows a flowchart of an example of a process that performs advance cache allocations.

FIG. 3 shows a flowchart of an example of a process that performs advance cache allocations. At 300, the process can select a job from a group of jobs. Selecting a job can include determining job priorities for the group of jobs and selecting the highest priority job. Selecting a job can include pulling a processor identifier or a job identifier from a queue such as a first-in-first-out (FIFO) queue or other type of queue. Selecting a job can include processing inter-process communication (IPC) message traffic and selecting a job that corresponds to a destination of an IPC message. At 305, the process can select a processor core from a group of processor cores to execute the selected job. Selecting a processor core can include determining whether a processor core is idle or about to become idle. At 310, the process can start the selected job on the selected processor core.

At 315, the process can receive a message describing future memory accesses that will be generated by the selected job. In some implementations, such a message can be referred to as a receive message, RECV message, or a RCV message. In some implementations, such a message can include a pointer to a buffer and a size value of the buffer. In some implementations, a size value is the size of the buffer in bytes or a multiple of a byte such as a word. In some implementations, such a message can include a start address and a size value. In some implementations, such a message can be generated by one or more instructions associated with the selected job. In some implementations, such a message can be generated by one job for another job. For example, one job writes to a buffer, whereas another job reads from the buffer. In some implementations, such a message can be generated by a scheduler. In some instances, the RECV messages contain information needed to access the data to be processed by the job (e.g., pointer, size, or both). For larger buffers which will not fit in the allocated ACA cache, the ACA can take hints from the processor or scheduler to indicate which portions to load. Additional loads of the cache can take place later based on further hints from the processor. This can differ from L1 cache in that not having the data in the cache merely causes a cache miss and the subsequent retrieval of the data from elsewhere. With L1 cache, not having the data can result in a system break or error. In some instances, the scheduler runs a job to process data. In some implementations, the job receives a message (e.g., a RECV message) to indicate the location of the data. In some implementations, the scheduler decides what data the scheduler wants the job to process next based on one or more scheduling algorithms.

At 320, the process can generate a memory burst request based on the message. In some implementations, the memory burst request is generated to load data elements from a buffer that is specified by the message received at 315. A data element can be a bit, byte, nibble, word, float, double, etc. In some implementations, the memory burst request is generated to load all data elements within a memory range specified by the message received at 315. A memory range can be defined by a start address and a size value or an end address. In some implementations, the memory burst request is a single command that is issued on a bus coupled with the memory. If the memory range is larger than a supported hardware burst size, then the memory burst request can include two or more commands corresponding to different portions of the memory range. In some implementations, the memory burst request specifies a processor core identifier to cause data elements to be transferred from the memory to a cache corresponding to the processor core identifier.

At 325, the process can perform the memory burst request to load data from a memory to at least a dedicated portion of a cache, the cache corresponding to the selected processor core. Performing the memory burst request can include transmitting one or more commands via a bus to a memory subsystem. The cache can be divided into slots. A slot can include two or more ways. In some implementations, a slot can include one or more ways that are dedicated to advance cache allocation. The dedicated ways of all of the slots can form the dedicated portion of the cache. In some implementations, the process can configure a size of the dedicated portion of the cache based on a size parameter. The size parameter can specify the number of ways to dedicate to advance cache allocation. In some implementations, the process can perform an action indicated by a send message to write one or more values from a dedicated portion of the cache to the memory. For example, a send message can cause the process to flush one or more dirty values from a portion of the cache that is dedicated to data associated with one or more send messages.

In some implementations, the selected job is started before the memory burst request is started. In some implementations, the selected job is started based on a completion of the memory burst request. In some implementations, the selected processor core is still running an old job while its cache is being loaded with data elements from the memory burst request. Memory requests from the running old job can have higher priority than the memory burst request. In some implementations, the selected job can start when a scheduler causes a switch from the old job to the selected job. Data in the dedicated ACA portions of the cache may remain in the same location after the selected job is started unless the space is needed or the data are otherwise removed. In some implementations, the process can cause the selected job to begin to access the data before the memory burst request is completed.

Figure 4:
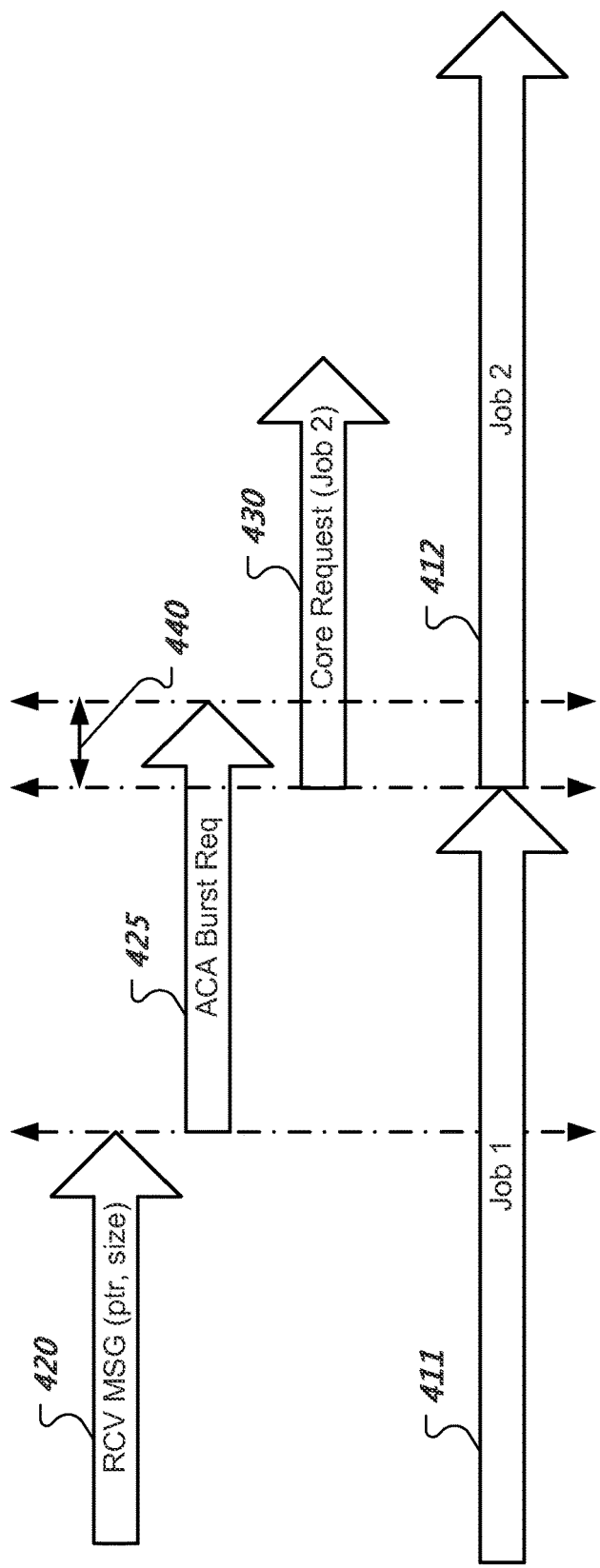
FIG. 4 shows a timeline of an example of an advance cache allocation process.

FIG. 4 shows a timeline of an example of an advance cache allocation process. While a processor is running a first job 411 in this example, advance cache allocations can start for a second job 412. In response to a receive message 420 that describes future memory accesses for the second job 412, an advance cache allocator can generate a burst request 425 based on the receive message 420. The receive message 420 can include a pointer to a memory area and a size. The burst request 425 can cause data elements to be transferred from the memory area that is identified by the receive message 420 to the processor's cache. When the processor starts to execute the second job 412, it can generate a core request 430 to memory. Since the advance cache allocator caused anticipated data elements to be loaded into the processor's cache, the core request 430 will result in a hit in the processor's cache. In this example, the second job 412 can start before the end of the completion of the burst request 425, which results in an overlap 440. During the overlap 440, core requests from the second job 412 can have priority over requests associated with the burst request 425. In some implementations, a scheduler can schedule the switch between the first job 411 and the second job 412 to occur at the time of completion of the burst request 425 to reduce or eliminate the overlap 440. In another example, the second job 412 can be started first, where the second job 412 can perform the receive and also start the burst request for the second job 412 while the second job 412 is still running.

Figure 5:
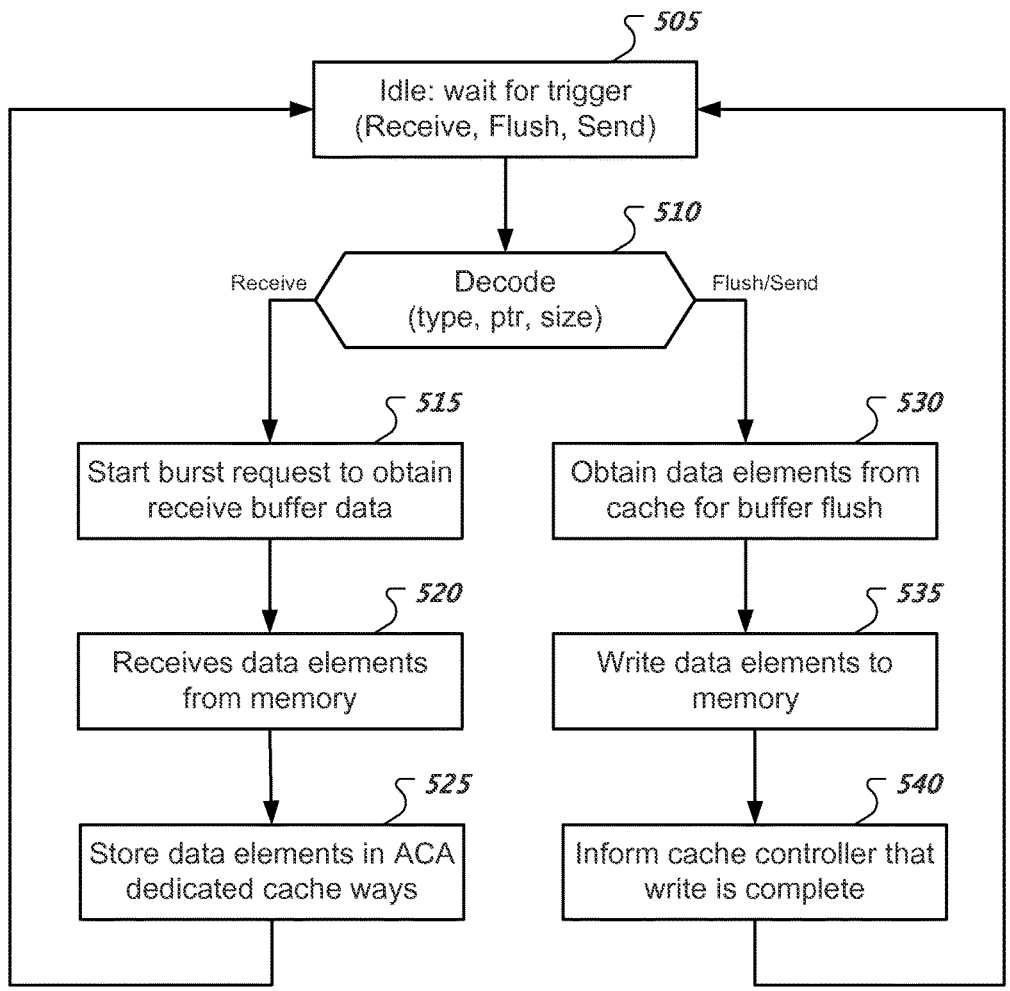
FIG. 5 shows a flowchart of an example of a process implemented by an advance cache allocator state machine.

FIG. 5 shows a flowchart of an example of a process implemented by an advance cache allocator state machine. At 505, the process waits for a trigger from a source such as a scheduler or processor. Various examples of a trigger includes a receive message, flush message, or send message. Other types of triggers are possible. A send message or a flush message causes a transfer of write data from cache to another memory, e.g., higher layer cache or main memory.

At 510, the process decodes the trigger. In some implementations, decoding the trigger can include extracting a trigger type, e.g., message type, extracting a pointer to a buffer, and/or extracting a buffer size.

Based on the trigger being a receive message, the process, at 515, starts a burst request to obtain receive buffer data. At 520, the process receives data elements from memory in response to the burst request. At 525, the process stores the received data elements in ACA-dedicated cache ways. In some implementations, as soon as the elements are received by an ACA, they are forwarded to a cache controller for storage in the cache. In some implementations, the process specifies a way index to cause the cache controller to store a data element in an ACA-dedicated way. After storing the data elements, the process waits for another trigger at 505.

Based on the trigger being a flush message or send message, the process, at 530, obtains data elements from cache for a buffer flush. At 535, the process writes data elements to memory. At 550, the process informs the cache controller that write is complete. After flushing, the process waits for another trigger at 505.

In general, any way or event that causes the ACA to know the data may be needed can trigger the send or flush message. For example, if the processor knows it will need a particular block of data, it can trigger the ACA to attempt to retrieve the data. In some instances, any information that notifies the ACA that data is no longer needed by the processor can cause the cache controller to flush data to make room for new blocks of data. Whereas a regular flush is usually performed by the processor and is based on contiguous memory addresses or the entire cache, the ACA send/flush also frees the way that was used once it is flushed, thereby allowing the ACA the opportunity to bring in other data.

Figure 6:
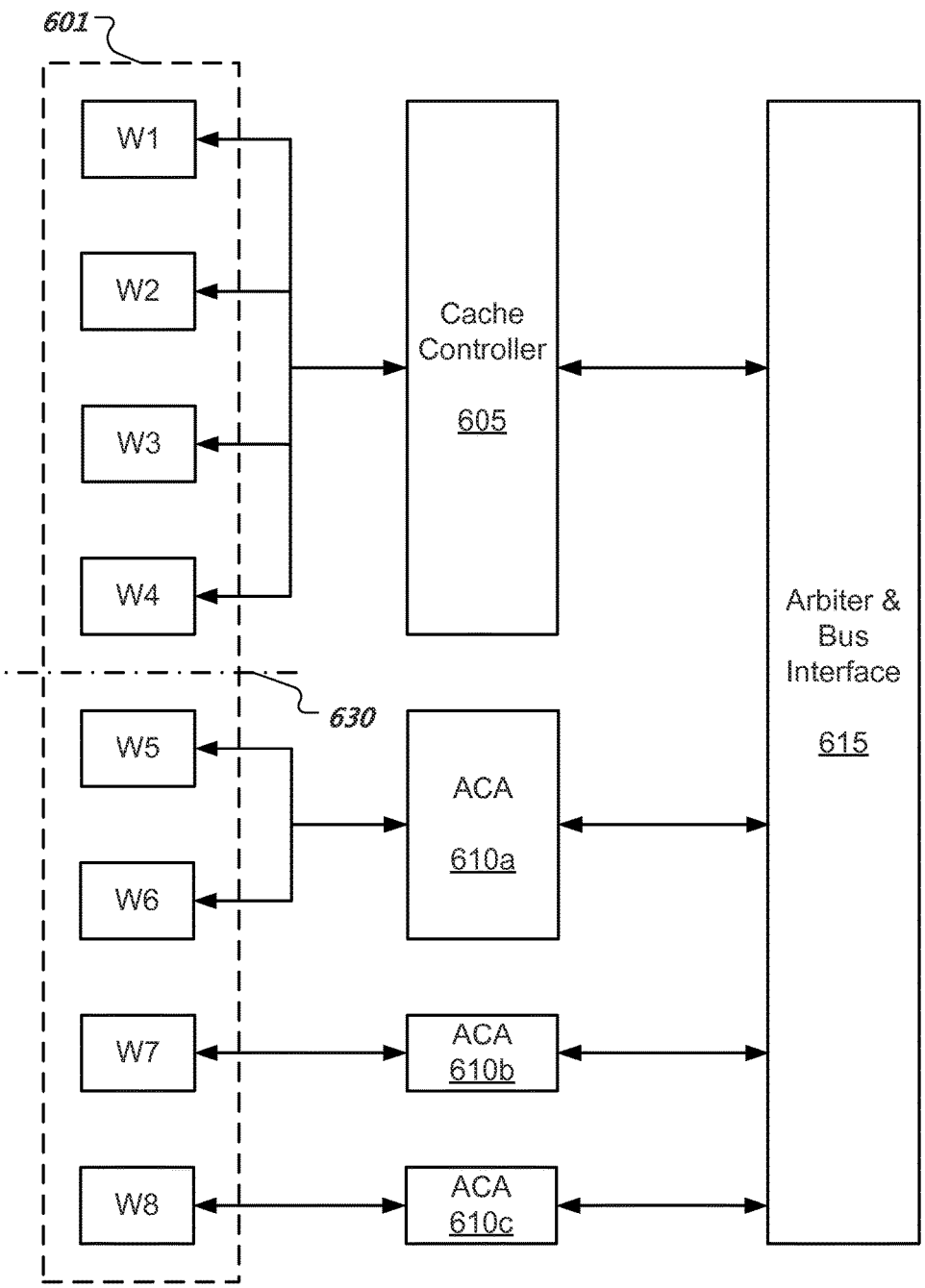
FIG. 6 shows an architecture of an example of a cache related portion of a computer system.

FIG. 6 shows an architecture of an example of a cache related portion of a computer system. In this example, one slot 601 of a cache is depicted. The slot 601 includes eight ways labeled W1 to W8. A processor can write to or read from any of these ways. A cache controller 605 manages four of the ways (W1 to W4) for processor core requests. ACAs 610*a*-*c* manage the other four of the ways (W5 to W8) for advance cache allocations. In this example, a first ACA 610*a* manages ways W5 and W6, a second ACA 610*b* manages W7, and a third ACA 610*c* manages W8. Note that different systems can have different numbers of ACAs and different mappings from those shown in FIG. 6. Further, the way mappings can be dynamically configurable. In some implementations, the number of ACA dedicated ways can be dynamically increased or decreased, via changing a virtual watermark 630, based on a buffer size parameter that is specified by a job or a group of jobs. In some implementations, a watermark 630 can be used to configure and manage the number of dedicated ways based on application needs and the total number of available ways. For example, if all of the ACA dedicated ways are occupied, the ACAs 610*a*-*c* can signal a full condition and a nominal way of allocating data can continue. In some implementations, the ACAs 610*a*-*c* do not overwrite their own data within a given message window. Note that the ACAs 610*a*-*c* can overwrite data from a previous message window for a new message window. For a given message window, once all four ACA ways are full, a fifth data element for the ACA ways in the slot 601 would be disregarded or simply not requested. However, in some implementations, such a fifth data element could be stored in a non-ACA dedicated way. In some implementations, core requests can replace data in ACA dedicated ways, as well. In some implementations, one or more of the ways in the slot 601 can be dedicated to core requests, with the ACAs 610*a*-*c* not permitted to write to the one or more dedicated core ways. In some implementations, the ACA accesses the cache ways through the cache controller and not directly.

The cache controller 605 can generate a memory request if there is a cache miss. Further, the ACAs 610*a*-*c* can generate a memory request if there is a trigger such as a receive message or a send message. An arbiter and bus interface 610 can arbitrate among requests should there be a conflict. Further, the arbiter and bus interface 610 can include circuitry to couple with a memory. In some implementations, the cache controller 605 can use LRU to manage data elements in its ways (W1 to W4). In some implementations, the ACAs 610*a*-*c* can use a round robin cache policy to manage data elements in their ways (W5 to W8). In some implementations, the core and the ACA can share ways using the same replacement scheme.

An advance cache allocation technique can include selecting a job from a plurality of jobs; selecting a processor core from a plurality of processor cores to execute the selected job; receiving a message which describes future memory accesses that will be generated by the selected job; generating a memory burst request based on the message; performing the memory burst request to load data from a memory to at least a dedicated portion of a cache, the cache corresponding to the selected processor core; and starting the selected job on the selected processor core. The cache can include a plurality of slots, where each of the slots includes one or more first ways and one or more second ways, and where the dedicated portion of the cache includes the one or more first ways of each of the slots. In some implementations, a cache can include first and second dedicated portions. Implementations can include performing an action indicated by a send message to write one or more values from the second dedicated portion of the cache to the memory. In some implementations, each of the slots includes one or more first ways, one or more second ways, and one or more third ways. In some implementations, the second dedicated portion of the cache can include the one or more third ways of each of the slots. Implementations can include configuring a size of the dedicated portion of the cache based on a size parameter. In some implementations, the message can include a start address and a size value. In some implementations, the message can include a pointer to a buffer and a size value of the buffer. In some implementations, the message is generated by one or more instructions associated with the selected job. In some implementations, the message is generated by a scheduler. In some implementations, the memory burst request is initiated after the selected job has started. Implementations can include causing the selected job to begin to access the data before the memory burst request is completed.

A system for advance cache allocation can include a bus to provide access to a memory; processor cores; caches coupled respectively with the processor cores and the bus; and a controller. The controller can be configured to select a job from a plurality of jobs to produce a selected job, select a processor core of the processor cores as a selected processor core to execute the job, receive a message which describes future memory accesses that will be generated by the selected job, generate a memory burst request based on the message, perform the memory burst request to load data from the memory to at least a dedicated portion of a cache of the caches, the cache corresponding to the selected processor core, and start the selected job on the selected processor core. In some implementations, the controller is configured to configure a size of the dedicated portion of the cache based on a size parameter. In some implementations, the message includes a pointer to a buffer and a size value of the buffer. In some implementations, the message is generated by a scheduler. In some implementations, the message is generated by a one or more instructions. In some implementations, the memory burst request is initiated after the selected job has started. In some implementations, the controller is configured to cause the selected job to begin to access the data before the memory burst request is completed. In some implementations, the controller is configured to perform an action indicated by a send message to write one or more values from a second dedicated portion of the cache corresponding to the selected processor core to the memory.

An apparatus for advance cache allocation can include first circuitry, such as a controller, processor, or specialized logic, configured to select a job from a plurality of jobs to produce a selected job, select a processor core of a plurality of processor cores as a selected processor core to execute the selected job, and start the selected job on the selected processor core; and second circuitry, such as a controller, processor, or specialized logic, configured to receive a message which describes future memory accesses that will be generated by the selected job, generate a memory burst request based on the message, and perform the memory burst request to load data from the memory to at least a dedicated portion of a cache corresponding to the selected processor core. In some implementations, the dedicated portion of the cache is a first dedicated portion of the cache, and the cache includes a second dedicated portion. In some implementations, the cache includes a plurality of slots, where each of the slots includes one or more first ways, one or more second ways, and one or more third ways. The second dedicated portion of the cache can include the one or more third ways of each of the slots. In some implementations, the second circuitry is configured to perform an action indicated by a send message to write one or more values from the second dedicated portion of the cache corresponding to the selected processor core to the memory.

While this document contains many specific implementation details, these should not be construed as limitations on the scope of any inventions or of what may be claimed, but rather as descriptions of features specific to particular embodiments of particular inventions. Certain features that are described in this document in the context of separate embodiments also can be implemented in combination in a single embodiment. Conversely, various features that are described in the context of a single embodiment also can be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method comprising:
   selecting a job from a plurality of jobs;
   receiving a message which describes a region of memory having data elements that will be used by the selected job, the message describing the region of memory having the data elements using a memory pointer and a size value which specify a range of the data elements that start at a location pointed to by the memory pointer;
   generating a memory burst request based on the message, the memory burst request being a request to load the data elements from the region of memory to at least a dedicated portion of a cache that corresponds to a processor core, wherein the memory burst request specifies the processor core to cause the data elements to be loaded to the at least a dedicated portion of the cache that corresponds to the processor core;
   performing the memory burst request to load the data elements from the region of memory to the at least a dedicated portion of the cache; and
   starting the selected job on the processor core, wherein the selected job uses the data elements in the at least a dedicated portion of the cache.

2. The method of claim 1, wherein the cache comprises a plurality of slots, wherein each of the slots comprises one or more first ways and one or more second ways, and wherein the dedicated portion of the cache comprises the one or more first ways of each of the slots.

3. The method of claim 2, wherein the dedicated portion of the cache is a first dedicated portion of the cache, wherein each of the slots comprises one or more third ways, and wherein a second dedicated portion of the cache comprises the one or more third ways of each of the slots, wherein the method comprises performing an action indicated by a send message to write one or more values from the second dedicated portion of the cache to the memory.

4. The method of claim 1, comprising:
   configuring a size of the dedicated portion of the cache based on a size parameter.

5. The method of claim 1, wherein the message is generated by one or more instructions associated with the selected job.

6. The method of claim 1, wherein the message is generated by a scheduler.

7. The method of claim 1, wherein the memory burst request to load the data elements from the region of memory to the at least a dedicated portion of the cache is initiated after the selected job has started.

8. The method of claim 1, wherein the selected job is one of:
   instructions from an operating system routine, or
   instructions from an application.

9. The method of claim 1, further comprising:
   causing the processor core to switch from a first job to the selected job,
   wherein the memory burst request is performed after the selected job has started.

10. A system comprising:
    a bus to provide access to a memory;
    processor cores;
    caches coupled respectively with the processor cores and the bus; and
    a controller configured to
       select a job from a plurality of jobs to produce a selected job,
       select a processor core of the processor cores as a selected processor core to execute the selected job,
       receive a message which describes a region of memory having data elements that will be used by the selected job, the message describing the region of memory having the data elements using a memory pointer and a size value which specify a range of the data elements that start at a location pointed to by the memory pointer,
       generate a memory burst request based on the message, the memory burst request being a request to load the data elements from the region of memory to at least a dedicated portion of a cache that corresponds to the selected processor core, wherein the memory burst request specifies the selected processor core to cause the data elements to be loaded to the at least a dedicated portion of the cache that corresponds to the processor core, perform the memory burst request to load the data elements from the region of memory to the at least a dedicated portion of the cache of the caches, and start the selected job on the selected processor core, wherein the selected job uses the data elements in the at least a dedicated portion of the cache.

11. The system of claim 10, wherein the cache comprises a plurality of slots, wherein each of the slots comprises one or more first ways and one or more second ways, and wherein the dedicated portion of the cache comprises the one or more first ways of each of the slots.

12. The system of claim 11, wherein the dedicated portion of the cache is a first dedicated portion of the cache, wherein each of the slots comprises one or more third ways, wherein a second dedicated portion of the cache comprises the one or more third ways of each of the slots, and wherein the controller is configured to perform an action indicated by a send message to write one or more values from the second dedicated portion of the cache to the memory.

13. The system of claim 10, wherein the controller is configured to configure a size of the dedicated portion of the cache based on a size parameter.

14. The system of claim 10, wherein the message is generated by a scheduler or one or more instructions associated with the selected job.

15. The system of claim 10, wherein the memory burst request to load the data elements from the region of memory to the at least a dedicated portion of the cache is initiated after the selected job has started.

16. An apparatus comprising:
first circuitry configured to select a job from a plurality of jobs to produce a selected job, select a processor core of a plurality of processor cores as a selected processor core to execute the selected job, and start the selected job on the selected processor core; and second circuitry configured to receive a message which describes a region of memory having data elements that will be used by the selected job, the message describing the region of memory having the data elements using a memory pointer and a size value which specify a range of the data elements that start at a location pointed to by the memory pointer, generate a memory burst request based on the message, the memory burst request being a request to load the data elements from the region of memory to at least a dedicated portion of a cache that corresponds to the selected processor core and the memory burst request specifying the processor core to cause the data elements to be loaded to the at least a dedicated portion of the cache that corresponds to the processor core, and perform the memory burst request to load the data elements from the region of memory to the at least a dedicated portion of the cache.

17. The apparatus of claim 16, wherein the dedicated portion of the cache is a first dedicated portion of the cache, wherein the cache comprises a plurality of slots, wherein each of the slots comprises one or more first ways, one or more second ways, and one or more third ways, wherein a second dedicated portion of the cache comprises the one or more third ways of each of the slots, and wherein the second circuitry is configured to perform an action indicated by a send message to write one or more values from the second dedicated portion of the cache to the memory.

* * * * *